United States Patent
Robison

(10) Patent No.: US 6,932,389 B2
(45) Date of Patent: Aug. 23, 2005

(54) CONNECTOR WITH FLUID LINE INSTALLATION INDICATOR

(75) Inventor: David L. Robison, Ashtabula, OH (US)

(73) Assignee: Perfection Corporation, Madison, OH (US)

( * ) Notice: Subject to any disclaimer, the term of this patent is extended or adjusted under 35 U.S.C. 154(b) by 0 days.

(21) Appl. No.: 10/749,826

(22) Filed: Dec. 31, 2003

(65) Prior Publication Data

US 2005/0140140 A1   Jun. 30, 2005

(51) Int. Cl.[7] .................................................. F16L 35/00
(52) U.S. Cl. ........................ 285/93; 285/342; 285/322
(58) Field of Search .......................... 285/93, 339, 342, 285/243, 255, 256, 307, 322, 323

(56) References Cited

U.S. PATENT DOCUMENTS

| | | |
|---|---|---|
| 2,755,109 A | 7/1956 | Risley |
| 3,384,392 A | 5/1968 | Gilchrist |
| 3,733,093 A | 5/1973 | Seiler |
| 3,815,940 A | 6/1974 | Luckenbill |
| 3,920,270 A | 11/1975 | Babb, Jr. |
| 4,025,093 A | 5/1977 | Leczycki |
| 4,068,866 A | 1/1978 | Saha |
| 4,229,025 A | 10/1980 | Volgstadt et al. |
| 4,282,175 A | 8/1981 | Volgstadt et al. |
| 4,323,727 A | 4/1982 | Berg |
| 4,407,526 A | 10/1983 | Cicenas |
| 4,416,472 A | 11/1983 | Fowler et al. |
| 4,427,220 A | 1/1984 | Decker |
| 4,445,714 A | 5/1984 | Kisiel, III |
| 4,482,170 A | 11/1984 | Jacobson et al. |
| 4,568,114 A | 2/1986 | Konrad |
| 4,628,965 A | 12/1986 | Passerell |
| 4,647,086 A | 3/1987 | Maxwell et al. |
| 4,705,304 A | 11/1987 | Matsuda et al. |
| 4,712,811 A | 12/1987 | Wier |
| 4,805,932 A | 2/1989 | Imhof et al. |
| 4,886,304 A | 12/1989 | Kunsman |
| 4,906,028 A | 3/1990 | Yokomatsu et al. |
| 4,906,030 A | 3/1990 | Yokomatsu et al. |
| 5,029,908 A | 7/1991 | Belisaire |
| 5,080,406 A | 1/1992 | Hyatt et al. |
| 5,082,315 A | 1/1992 | Sauer |
| 5,090,741 A | 2/1992 | Yokomatsu et al. |
| 5,102,170 A | 4/1992 | Inoue |

(Continued)

FOREIGN PATENT DOCUMENTS

GB   970887   9/1964

*Primary Examiner*—Aaron Dunwoody
(74) *Attorney, Agent, or Firm*—Fay, Sharpe, Fagan, Minnich & McKee, LLP

(57) ABSTRACT

A connector adapted for use with an associated fluid line includes a connector body having a passage dimensioned to receive the associated fluid line and a capturing member supported on said connector body. The capturing member is suitable for retaining the associated fluid line in the passage. A sealing member is disposed within the passage and is suitable for forming a fluid-tight seal between the connector body and the associated fluid line. A stiffening member is disposed within the connector body along the passage, and an indicator is disposed within the connector body and is adapted to indicate that the associated fluid line has been received a predetermined distance into the passage.

17 Claims, 4 Drawing Sheets

U.S. PATENT DOCUMENTS

| | | |
|---|---|---|
| 5,112,087 A | 5/1992 | Haruki |
| 5,150,925 A | 9/1992 | Yokomatsu et al. |
| 5,195,757 A | 3/1993 | Dahll, V |
| 5,332,269 A | 7/1994 | Homm |
| 5,335,946 A | 8/1994 | Dent et al. |
| 5,366,260 A | 11/1994 | Wartluft |
| 5,474,336 A | 12/1995 | Hoff et al. |
| 5,669,637 A | 9/1997 | Chitty et al. |
| 5,692,785 A | 12/1997 | Wartluft et al. |
| 5,803,513 A | 9/1998 | Richardson |
| 5,947,532 A | 9/1999 | Lorenz |
| 6,142,538 A | 11/2000 | Volgstadt et al. |
| 6,158,743 A | 12/2000 | Anderson et al. |
| 6,371,531 B1 | 4/2002 | Robison |

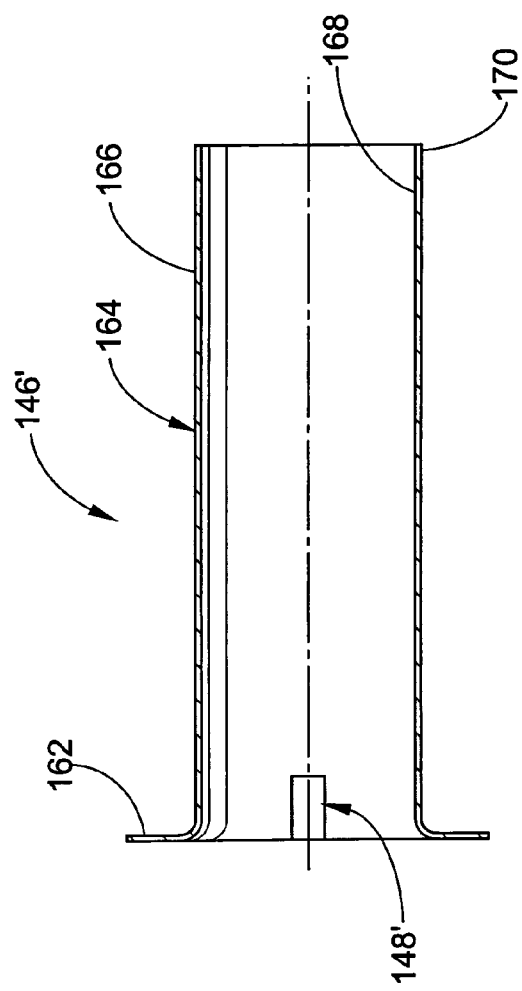
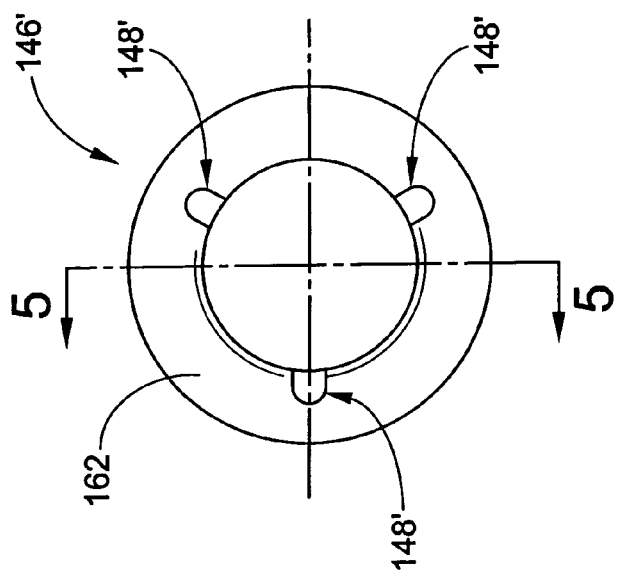
FIG. 5
FIG. 4

CONNECTOR WITH FLUID LINE INSTALLATION INDICATOR

BACKGROUND

The present invention broadly relates to the art of fluid distribution systems and, more particularly, to a connector adapted for use on an associated fluid line and having an indicator that visually indicates the complete and proper installation of the connector on the associated fluid line.

Fluid line connectors of a wide variety of types and styles are well known and commonly used. One such connector is a push-on or stab-type connector that is installed on the end of a length of smooth-walled tubing and is useful for connecting the tubing to an associated device or apparatus, such as a gas meter or another length of tubing, for example. Such connectors can typically be quickly and conveniently installed on the tubing end without the use of tools. Prior to installation of the connector, the end of the length of tubing can be trimmed, chamfered and/or otherwise prepared, and the connector thereafter pushed onto the tubing end. A capturing member or other suitable arrangement is usually provided on the connector to secure the same to the tubing end.

Push-on or stab-type connectors have a number of disadvantages associated with the use thereof. One disadvantage is that it is generally not possible to visually determine whether the tubing has been properly and completely seated within the connector to form a fluid-tight seal therewith. Various methods have been devised to provide at least an indication of the amount of tubing extending into the connector or, said differently, the distance the tubing end extends into the connector. In one such method, a technician makes a mark on the tubing at a predetermined distance from the end of the tubing. The tubing is then inserted into the connector, and the mark is used to determine whether a sufficient length of tubing has been delivered into the connector to form a secure and fluid-tight connection. Such a method, however, makes only an indirect determination of the quality of the connection. As such, a situation remains in which it is typically not possible for the technician to directly determine that a complete and proper connection has been made between the connector and the tubing.

In certain applications, the length of tubing is covered by a flexible sheath to help protect the tubing from being inadvertently cut or otherwise damaged. To install a push-on type connector on such a length of tubing, it is common for the technician to force the sheath away from the tubing end to expose the same. Using the method mentioned above, the technician often makes a mark on the tubing at a predetermined length from the end thereof prior to installing the connector on the tubing end. Another disadvantage is that such a technique is often difficult to accomplish by one person, as the technician must typically hold the tubing, hold back the sheath, hold and align the measuring device, and make the mark. However, this remains one of the few options available to the technician to ensure that known connectors are being properly installed.

A further disadvantage of known connectors is that the same are generally not removable and, as such, are generally limited to one installation or use. Where a technician is unsure whether the connector has been properly installed on a tubing end, the connector may be removed from the length of tubing by cutting the tubing below the connector and discarding the entire severed portion. The tubing end is then prepared for the installation of a new connector. In such situations, it is possible that the technician has cut off and discarded a properly installed connector. This undesirably adds time and expense to the installation.

SUMMARY

In accordance with the present invention, a connector is provided that is adapted for use with an associated fluid line and includes a connector body having a passage dimensioned to receive the associated fluid line. A capturing member is supported on the connector body and is suitable for retaining the associated fluid line in the passage. A sealing member is disposed within the passage and is suitable for forming a fluid-tight seal between the connector body and the associated fluid line. A stiffening member is disposed within the passage, and an indicator is adapted to indicate that the associated fluid line has been received a predetermined distance into the passage.

Additionally, a connector is provided that is adapted for use with an associated fluid line having an inside wall and an outside wall. The connector includes a connector body having a passage extending therethrough. The passage is dimensioned to receive the associated fluid line. A capturing member is supported on the connector body and is suitable for retaining the associated fluid line the passage. A sealing member is disposed within the passage and is suitable for forming a fluid-tight seal between the connector body and the outside wall of the associated fluid line. A stiffening member is disposed within the passage and at least a portion of the stiffening member is dimensioned to be received within the inside wall of the associated fluid line. An indicator is adapted to indicate that the associated fluid line has been received a predetermined distance into the passage.

Furthermore, a connector is provided that is adapted for use with an associated fluid line having an inside wall and an outside wall and including a connector body having a first end adapted to receive the associated fluid line, a second end opposite the first end, a passage extending through the connector body between the first and second ends, and a shoulder within the passage between the first and second ends. A capturing member is supported on the connector body and is adapted to engage the outside wall of the associated fluid line to retain the same in the passage. A sealing member is disposed within the passage and is suitable for forming a fluid-tight seal between the connector body and the associated fluid line. A stiffening member having a sleeve portion and a flange portion is positioned within the passage such that the flange portion is adjacent the shoulder. The sleeve portion is dimensioned to be received within the inside wall of the associated fluid line. An indicator is adapted to indicate that the associated fluid line has been received a predetermined distance into the passage.

Further still, a method of installing a connector on an end of an associated fluid line is provided and includes the steps of providing a connector having a connector body with a passage dimensioned to receive the associated fluid line, a capturing member supported on the connector body and suitable for retaining the associated fluid line in the passage, a sealing member disposed within the passage and suitable for forming a fluid-tight seal between the connector body and the associated fluid line, a stiffening member disposed within the passage of the connector body, and an indicator adapted to indicate that the associated fluid line has been received a predetermined distance into the passage. Another step includes inserting the end of the associated fluid line into the passage of the connector body, and a further step includes observing the indicator to thereby show the end of the associated fluid line extending a predetermined distance into the passage.

BRIEF DESCRIPTION OF THE DRAWINGS

FIG. 4 is an end view of another embodiment of a stiffening member having a plurality of indicators.

FIG. 5 is a side view, in cross-section, of the stiffening member in FIG. 4 taken along line 5—5.

DETAILED DESCRIPTION OF THE PREFERRED EMBODIMENTS

Figure 1:
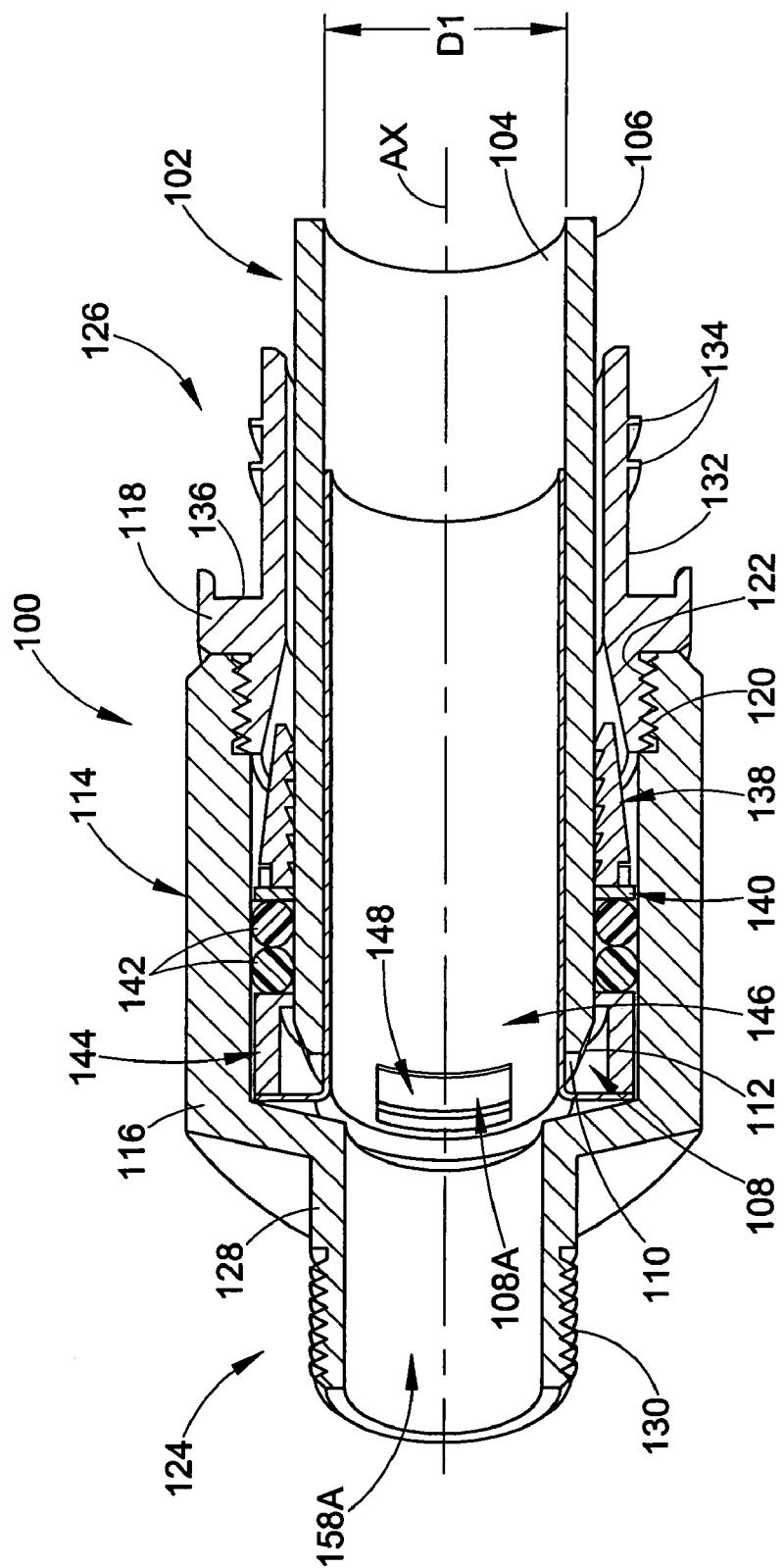
FIG. 1 is a perspective view, in cross-section, of a connector in accordance with the present invention shown installed on a tubing end.

Referring now in greater detail to the drawings, wherein the showings are for the purposes of illustrating preferred embodiments of the invention only and not for the purpose of limiting the invention, FIG. 1 illustrates a connector 100 shown installed on a length of tubing 102 having an inside wall 104 and an outside wall 106, and terminating at a tubing end 108 having an end wall 110 and a chamfer 112. Tubing 102 has an inside diameter dimension D1 of any suitable size, such as from about ¼ of an inch to about 2 inches, for example.

Connector 100 includes a connector body 114 having a first portion 116, a second portion 118, and an axis AX. First and second portions 116 and 118 threadably interengage one another by way of respective female threads 120 and male threads 122. It will be appreciated, however, that any suitable connection or manner of joining the first and second portions can be used and that, alternately, the connector body can be of a unitary construction. Connector body 114 has a first end 124 and a second end 126. A cylindrical projection 128 extends axially outwardly from first portion 116 at first end 124. A suitable feature, such as male threads 130, for example, for interconnecting connector 100 to another component or apparatus is provided on projection 128. It will be appreciated, however, that any suitable feature or connection can be used without departing from the principles of the present invention.

Figure 2:
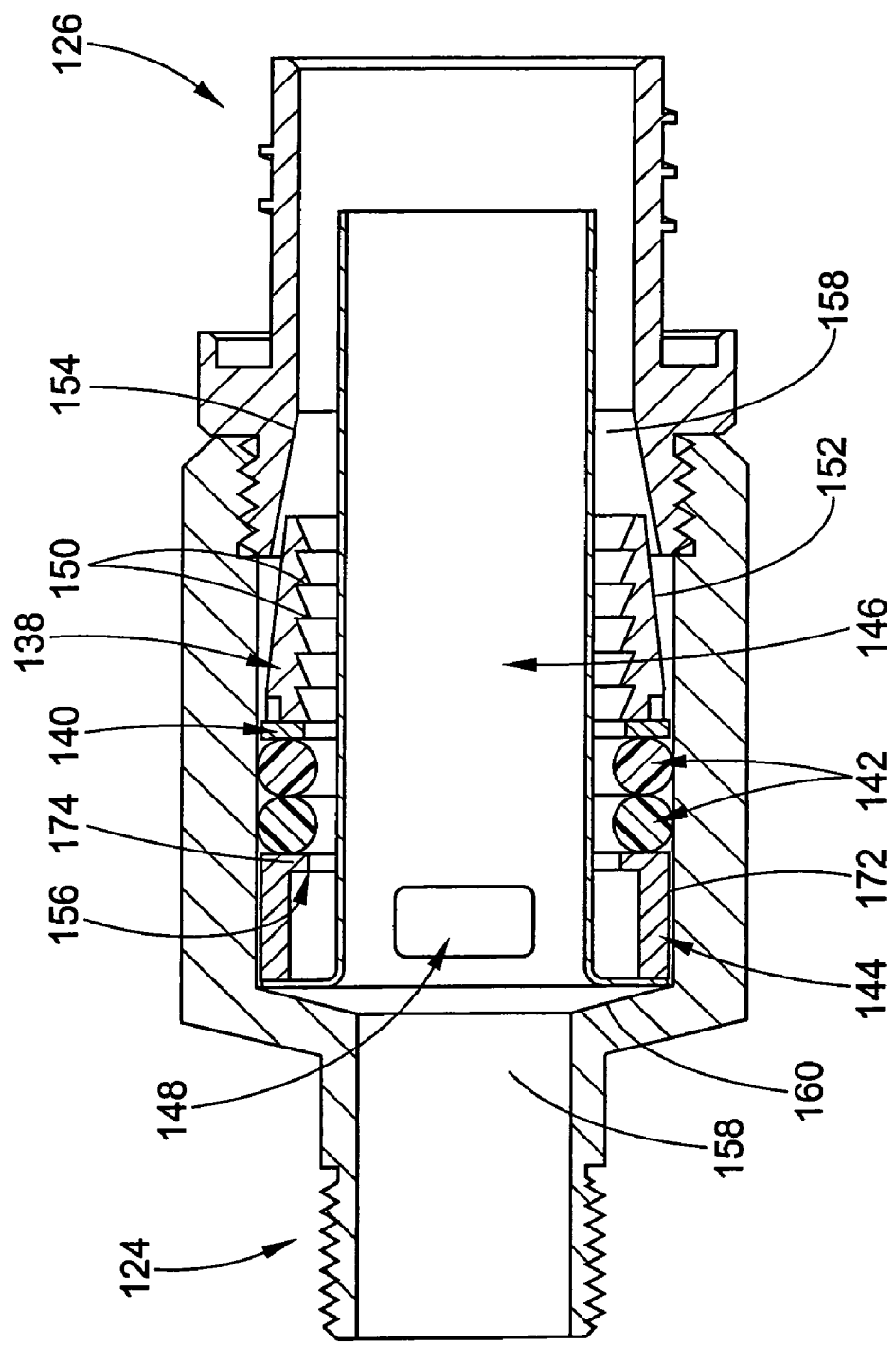
FIG. 2 is a side view, in cross-section, of the connector of FIG. 1 shown prior to installation on a tubing end.

A cylindrical projection 132 extends from second portion 118 at second end 126. Cylindrical projection 132 is optionally provided and can be used, for example, in applications in which tubing 102 is covered by a sheath (not shown). In such case, the sheath preferably extends along the outside of projection 132 and can be secured thereto in any suitable manner, such as, by using a clamp or crimped band (not shown), for example. It will be appreciated that in some applications, the sheath is formed from one or more helically wound elements, such as, metallic strands, for example. One or more helically extending ridges 134 can optionally be provided on projection 132 to threadably engage the windings of the sheath and aid in securing the same to the connector body. In such case, ridges 134 are preferably cooperable with the windings of the sheath such that the connector body can be threaded into the sheath. An annular cavity 136 is also shown in FIGS. 1 and 2, and the connector body can be rotated such that the end (not shown) of the sheath (not shown) seats within cavity 136 preventing further rotation thereof. Additionally, helical ridges 134 can also be used to aid in the retention of sheaths made from more flexible materials, such as braiding, for example, that do not extend in such a helical nature. Alternately, an embodiment having annular ridges (not shown) can be used.

As shown in FIGS. 1 and 2, connector 100 also includes a capturing member 138, a washer 140, a sealing member, such as o-rings 142, for example, a retaining member 144, a stiffening member 146, and an indicator, such as an opening or window 148, for example.

Capturing member 138 includes a plurality of radially inwardly extending teeth 150 suitable for interengaging outside wall 106 of tubing 102. Capturing member 138 also includes a frustoconical outside wall 152. One or more slots (not shown) can be provided in capturing member 138, as is well known by those of skill in the art, to permit the capturing member to be radially inwardly deflected as frustoconical outside wall 152 is axially displaced along frustoconical inside wall 154 of second portion 118. In operation, as a technician, for example, attempts to withdraw tubing 102 from connector 100, teeth 150 are caused to further engage outside wall 106 of the tubing as capturing member 138 is radially inwardly deflected due to the axial movement of the tubing. This substantially prevents the removal of tubing 102 from connector 100. It will be appreciated, however, that any suitable configuration or device can be used to retain the tubing within the connector without departing from the principles of the present invention.

Retaining member 144 includes a generally cylindrical outer wall 172 and a radially inwardly extending flange 174 having a tooth or edge 156 disposed thereon. Edge 156 is adapted to engage outside wall 106 of tubing 102 and further retain the same within the connector.

A passage 158 extends through connector body 114 between first and second ends 124 and 126. A shoulder 160 is provided along passage 158 toward first end 124. Additionally, it will be appreciated that capturing member 138, washer 140, o-rings 142 and retaining member 144 each have an opening or passage extending centrally therethrough substantially along axis AX (FIG. 1). Stiffening member 146 extends from adjacent shoulder 160 along passage 158 and centrally through the retaining member, o-rings, washer and capturing member along axis AX (FIG. 1).

Figure 3:
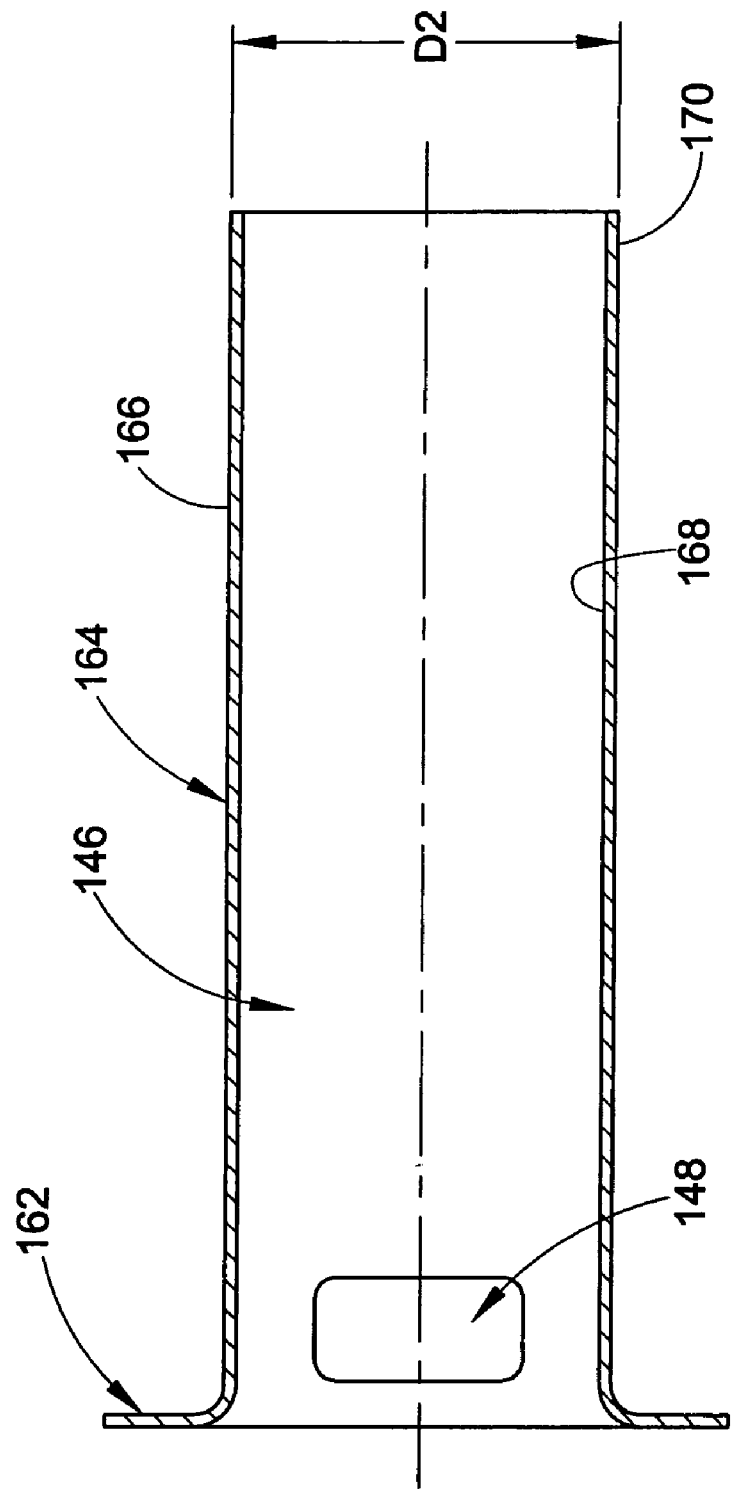
FIG. 3 is a side view, in cross-section, of the stiffening member and indicator shown in FIGS. 1 and 2.

Stiffening member 146 is shown in FIG. 3 and includes a flange portion 162 and a sleeve portion 164. The sleeve portion includes an outside wall 166 and an inside wall 168. In one embodiment, outside wall 166 has an outside diameter D2. Dimension D2 can be of any suitable size, such as from about ³⁄₁₆ of an inch to about 2 inches, for example. Preferably, dimension D2 of sleeve portion 164 is cooperable with dimension D1 of tubing 102 such that the sleeve portion can be received inside tubing 102. A chamfer 170 or other feature can optionally be provided at the end of sleeve portion 164 opposite flange portion 162 to facilitate entry of the sleeve portion into the tubing.

One or more openings or windows 148 extend through at least a portion of one of the flange portion and sleeve portion of the stiffening member. It will be appreciated that windows 148 are merely one example of a suitable indicator and that indicators having additional components can be used. For example, an indicator could alternately and/or additionally include an element that projects from the connector body and/or the stiffening member when the tubing reaches a predetermined position within the connector body. Window 148 is shown in FIGS. 1–3 as being substantially rectangular. However, it will be further appreciated that the window can take any suitable size, shape or configuration without departing from the principles of the present invention.

Another embodiment of a stiffening member 146' is shown in FIGS. 4 and 5. It will be appreciated that stiffening member 146' is substantially similar to stiffening member 146, and as such, like features are shown with like item numbers. However, stiffening member 146' includes a plurality of openings or windows 148' disposed circumferentially around the stiffening member. Windows 148' extend radially outwardly along flange portion 162 and axially along sleeve portion 164. It will be appreciated that in another alternate embodiment, one or more windows could be provided that extend only along the flange portion of the stiffening member.

In installing connector 100 on tubing end 108 of tubing 102, the technician preferably properly trims or otherwise prepares the tubing end prior to installation. The tubing end is thereafter inserted into passage 158 of connector 100 at second end 126. Preferably, sleeve portion 164 of stiffening member 146 is suitably dimensioned to be received into tubing 102 as the tubing is inserted into the connector. Once end wall 110 extends into and through the central passage or opening through capturing member 138, the tubing is generally substantially unable to be removed from the connector due to the engagement of teeth 150 into outside wall 106. However, it should be appreciated that the tubing has not been fully and properly seated within the connector at this point. However, by visually inspecting window 148 in stiffening member 146 through passage 158A at first end 124, the technician can determine that the tubing has not been fully inserted into the connector. This is easily determined because the tubing is of a different color and preferably a significantly contrasting color, such as yellow, for example, than the color of the stiffening member, which might be silver, gray or black, for example. Further insertion of the tubing causes end wall 110 to pass into and through washer 140, O-rings 142 and retaining member 144. Upon passing sufficiently into and/or through retaining member 144, tubing end 108 is clearly visible by its contrasting through window 148 as indicated by arrow 108A.

While the invention has been described with reference to preferred embodiments and considerable emphasis has been placed herein on the structure and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. Rather, it is intended that the invention be construed as including all such modifications and alterations insofar as they come within the scope of the appended claims and the equivalents thereof.

What is claimed is:

1. A connector adapted for use with an associated fluid line, said connector comprising:
    a connector body having a passage dimensioned to receive the associated fluid line;
    a capturing member supported on said connector body and retaining the associated fluid line in said passage;
    a sealing member disposed within said passage and forming a fluid-tight seal between said connector body and the associated fluid line;
    a stiffening member disposed within said connector body along said passage, said stiffening member having a sleeve portion and a flange portion; and,
    an indicator provided on said stiffening member along at least one of said sleeve portion and said flange portion and adapted to indicate that the associated fluid line has been received a predetermined distance into said passage.

2. A connector according to claim 1, wherein said indicator includes a window extending through said stiffening member.

3. A connector according to claim 2, wherein said window has a substantially rectangular peripheral shape.

4. A connector according to claim 1, wherein said capturing member includes a radially inwardly extending annular tooth suitable for engaging the associated fluid line.

5. A connector according to claim 4, wherein said capturing member includes a frustoconical external wall.

6. A connector according to claim 5, wherein said connector body includes a frustoconical internal wall portion cooperable with said frustoconical external wall of said capturing member.

7. A connector adapted for use with an associated fluid line having an inside wall and an outside wall, said connector comprising:
    a connector body having a passage extending therethrough, said passage dimensioned to receive the associated fluid line;
    a capturing member supported on said connector body and retaining the associated fluid line in said passage;
    a sealing member disposed within said passage and forming a fluid-tight seal between said connector body and the outside wall of the associated fluid line;
    a stiffening member disposed within said passage and at least a portion of said stiffening member is dimensioned to be received within the inside wall of the associated fluid line, said stiffening member including a flange portion and a sleeve portion; and,
    an indicator disposed within said connector body at least partially along one of said flange portion and said sleeve portion, and said indicator being adapted to indicate that the associated fluid line has been received a predetermined distance into said passage.

8. A connector according to claim 7, wherein said indicator includes a window extending through said stiffening member.

9. A connector according to claim 7, wherein said connector body has a first body portion and a second body portion, and said passage extends at least partially through each of said first and second portions.

10. A connector according to claim 9, wherein said first body portion includes a shoulder disposed along said passage.

11. A connector according to claim 9, wherein said second body portion has an axially extending projection adapted to support an associated sheath of the fluid line.

12. A connector according to claim 7, wherein said capturing member includes a frustoconical outer wall and a plurality of radially inwardly extending annular teeth adapted for engaging the outer surface of the associated fluid line.

13. A connector according to claim 12, wherein said connector body includes a frustoconical inside wall portion cooperable with said frustoconical outer wall of said capturing member.

14. A connector according claim 7 further comprising a retaining member disposed within said passage, said retaining member having a radially inwardly projecting edge adapted to engage the outer wall of the associated fluid line.

15. A connector adapted for use with an associated fluid line having an inside wall and an outside wall, said connector comprising:
- a connector body having a first end adapted to receive the associated fluid line, a second end opposite said first end, a passage extending through said connector body between said first and second ends, and a shoulder within said passage between said first and second ends;
- a capturing member supported on said connector body, said capturing member engaging the outside wall of the associated fluid line to retain the associated fluid line in said passage;
- a sealing member disposed within said passage and suitable for forming a fluid-tight seal between said connector body and the associated fluid line;
- a stiffening member having a sleeve portion and a flange portion, said stiffening member is positioned within said passage such that said flange portion is adjacent said shoulder, said sleeve portion dimension to be received within the inside wall of the associated fluid line; and,
- an indicator disposed within said passage and adapted to indicate that the associated fluid line has been received a predetermined distance into said passage, said indicator being disposed along at least a portion of one of said flange portion and said sleeve portion of said stiffening member.

16. A connector according to claim 15, wherein said indicator includes a window extending through said stiffening member.

17. A connector according to claim 16, wherein said window is operative to provide said visually observable characteristic by exposing at least one of the inside wall, the outside wall and the end portion of the associated fluid line.

* * * * *